United States Patent [19]

Brazier

[11] 4,162,368
[45] Jul. 24, 1979

[54] ASSEMBLY OF FURNACE ELECTRODES
[75] Inventor: Ernest R. Brazier, Maidenhead, England
[73] Assignee: ERCO Industries Limited, Islington, Canada
[21] Appl. No.: 862,407
[22] Filed: Dec. 20, 1977
[51] Int. Cl.$^2$ ............................................. H05B 7/14
[52] U.S. Cl. .................................................. 13/18 C
[58] Field of Search ................. 13/18, 18 C; 403/296, 403/DIG. 5; 29/628; 174/945

[56] References Cited

U.S. PATENT DOCUMENTS

| | | | |
|---|---|---|---|
| 3,517,954 | 6/1970 | Snyder et al. | 13/18 X |
| 3,550,270 | 12/1970 | Watson, Jr. et al. | 403/296 X |

Primary Examiner—R. N. Envall, Jr.
Attorney, Agent, or Firm—Sim & McBurney

[57] ABSTRACT

Electrode breakages in segmented carbon electrodes used in continuous electric arc furnaces are overcome by an electrode assembly procedure in which the nipples which join the electrode segments are screwed together with the appropriate socket in the electrode segment under tension. The tensioning causes honing of the abutting thread faces of the nipple and socket and an increased area of thread content is achieved in the assembled electrode. In this way, improved joint strength and electrical conductivity through the electrode and decreased differential thermal stresses within the joint are achieved.

9 Claims, 1 Drawing Figure

U.S. Patent
Jul. 24, 1979
4,162,368
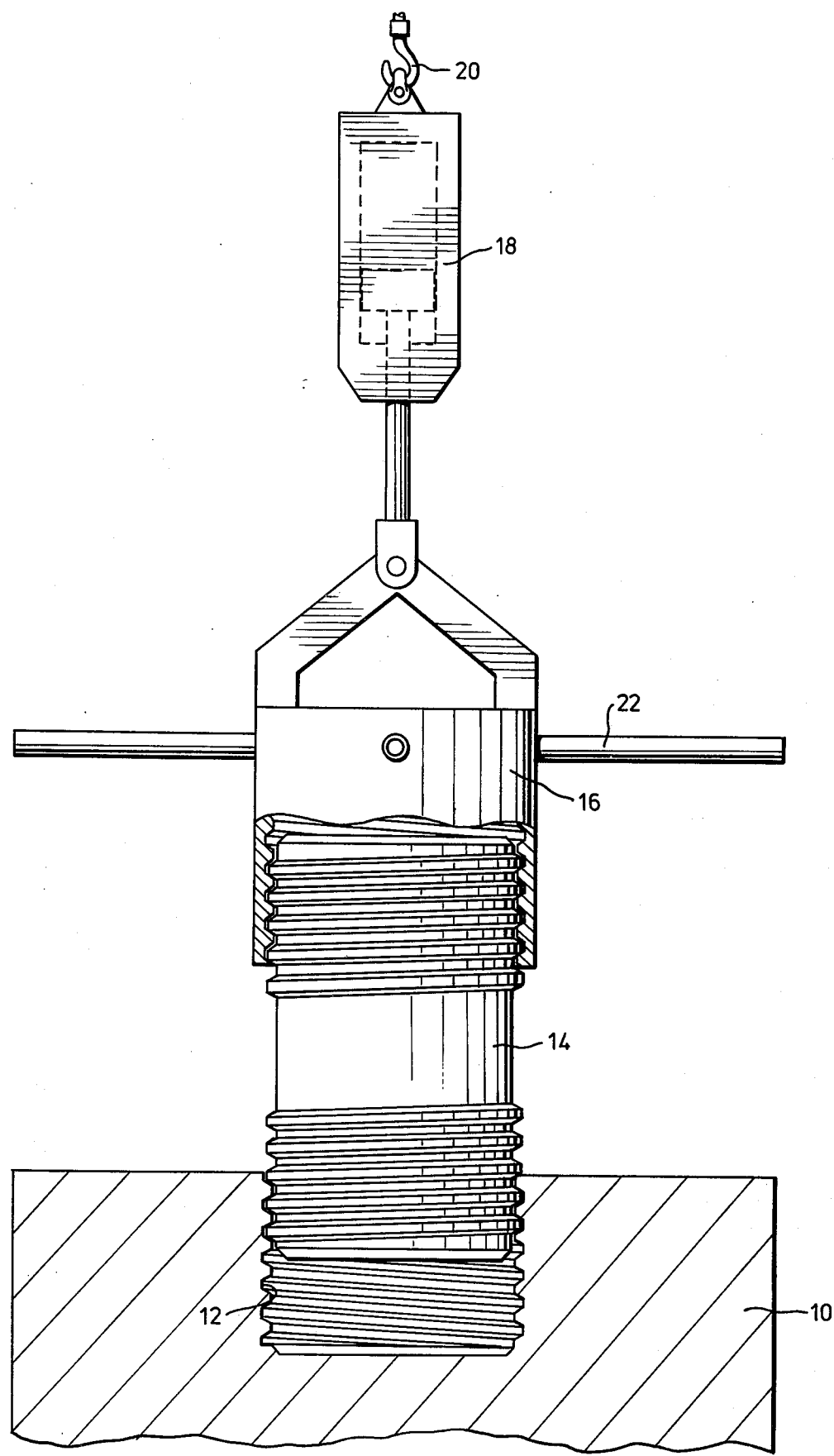

ASSEMBLY OF FURNACE ELECTRODES

FIELD OF INVENTION

The present invention relates to improvements in and relating to electric furnaces of the continuous electric arc type. Such furnaces are widely used for the manufacture of phosphorus by the thermal method, and also for making such products as carbide, ferrosilicon and ferromanganese. More particularly, the invention relates to an improved method of assembly of electrode segments in such electric furnaces.

BACKGROUND TO THE INVENTION

Typically, furnaces of the foregoing type employ downwardly disposed suspended carbon electrodes which gradually erode at the tip. In order to maintain a constant arc length the electrode is gradually lowered further into the furnace. The electrode is constructed of segments, each new segment being attached in situ to the upper end of the existing electrode, as required to maintain the operation of the furnace. The usual method of assembly is to provide each electrode segment with a screw threaded socket at either end. Successive segments are usually joined by a correspondingly screw threaded cylindrical connector, known as a nipple, part of which is screwed into each of the segments joined thereby. Normally when the segments are assembled, according to the prior act, they are screwed together under a generally compressive force.

A problem which has been encountered, particularly in larger installations, is a tendency for the electrode to break, resulting in a serious loss of production every time it has to be replaced. We now believe that a major cause of stress in the electrode, leading to breakages, has in the past been poor connection between the faces of the screw thread on the nipple and the socket respectively. This arises because these members are constructed from various forms of carbon whose mechanical properties make it impractical to machine the thread with sufficient accuracy to ensure good contact between each of the faces. The usual method of assembly, done under a generally compressive force, does not improve this condition because during such an assembly only the outer face of each screw thread will abrade. Particles abraded from these outer faces may collect between the inner faces of the threads further decreasing the area of contact. Yet, it is these inner faces that act as load bearing faces when the electrode is suspended in the furnace. Thus, the weight of the assembled electrode may cause the collapse of the surface of the threads at some of the highly loaded points of contact resulting in separation of the abutting end faces of the successive electrode segments. As a consequence, the whole current then passes through the narrow area of contact between the threads, producing localized overheating, thermal stresses and ultimately, breakage.

SUMMARY OF INVENTION

The present invention is directed to an improved method of assembly of the electrode segments, which overcomes the prior art problems. It was found that, surprisingly, stronger and more consistent joints are produced with resulting decreased electrode breakages and thus improved overall efficiency of the furnace operation by following a novel method of assembly.

The method of the present invention comprises a preliminary step of honing the mating threads of the joint under tension, followed by the actual addition of the new segment to the electrode, commonly termed "heading up" the electrode, also done under tension.

With these operations carried out under tension, the inner load bearing faces of the screw threads of a member in the joint are honed by friction with the corresponding faces of the threads on the other member. Thus, an increased area of contact between the inner faces of the threads is achieved. This improves the load bearing characteristics of the threads thus minimizing the chance of their collapse. In addition, the much improved contact of the inner faces of the threads honed together improves electrical conductivity through the electrode, further decreasing thereby the chances for differential thermal stresses and hence breakage.

BRIEF DESCRIPTION OF DRAWING

The sole FIGURE of the drawing is an elevational view of an electrode, electrode nipple and equipment assembling the same.

GENERAL DESCRIPTION OF INVENTION AND DESCRIPTION OF PREFERRED EMBODIMENT

A better understanding of the present invention may be obtained by a stepwise description of a typical operation for adding a new electrode segment to the upper end of an existing electrode in a furnace. The operation described is one embodiment of the invention and modifications to it within the scope of the invention will be obvious to those skilled in the art.

The first stage of the assembly is the preparation of the joint and comprises an initial honing operation which is illustrated in the FIGURE.

The new electrode segment 10 is held securely in a vertical position by a suitable support (not shown). In this position the electrode segment is in identical orientation to that it will assume, after assembly, at the top of the electrode, i.e., the threaded socket 12 at the top of the segment will be the top socket on the electrode 10 after installation. The top socket of the segment is identified with a suitable mark and a corresponding identifying mark is placed at one end of a threaded nipple 14. This particular end of the selected nipple 14 is the one to be honed in the socket at the top end of the new electrode segment 10. The corresponding identifying marks serve to ensure that in a future step in the sequence of "heading up" the electrode in the furnace, after the new segment has been installed and become part of the electrode and the next new segment is to be added to it, this particularly marked pre-honed nipple end will be the one used as the connector member for its correspondingly marked socket which at that time will be the top socket on the existing electrode in the furnace.

The threads in the electrode socket 12 and those on the nipple end usually are first smoothed off by, for example, wire brushing, followed by cleaning the threads by, for example, blowing off loose particles with compressed air.

A thin disc, typically about $\frac{1}{4}''$ thick, is usually then placed in the base of the socket. The disc is dimensioned to engage the lower end of the nipple 14 screwed into the socket and has a diameter up to about 70%, preferably up to about 45% of the diameter of the socket. The disc typically is made of plywood, although other material with similar properties, such as, masonite may be used.

The functions of this disc during the initial honing operation are to keep the face of the nipple end and that of the socket base from slamming together when the nipple is screwed home as is described below and to minimize the chances of interference between the respective faces of the nipple and the socket base, which may be caused by possible excessive unevenness of these faces.

The nipple 14 is now suspended over the socket by a cage-like framework 16 having threads engaging the threads at the upper end of the nipple 14, the cage 16 being connected through a hydraulic tensioning device 18 to the hook 20 of a chainfall secured to a crane (not shown), in such a way that the end of the nipple 14, marked as described above, faces the socket 12 identified with the corresponding mark.

The nipple 14 is carefully centered over the socket, preferably by a suitable centralization device, and then it is screwed home until it snug fits against the disc at the bottom of the socket while tension is being applied between the nipple 14 and the electrode segment 10. Tension during the screwing in operation can be maintained in various ways. One convenient method is that illustrated wherein the tension is applied hydraulically by hydraulic tensioning device 18 so that while the new electrode segment 10 is held securely in a fixed vertical position and exerts a considerable downward force as a result of its weight, the nipple 14 is screwed into it by rotation of the cage 16 using lever arms or turning handles 22 against the pull of the hydraulic tensioning device 18. During this operation the inner faces of the screw threads of the socket 12 are honed with the corresponding faces of the threads on the nipple end, as may be seen from the relative positioning of the threads in the FIGURE.

In a preferred way of carrying out the above described honing operation, no tension is applied during the engagement of the first or possibly the first two threads in order to minimize the risk of breaking these threads during tensioning, and tension thereafter is applied for the remainder of the honing operation.

The minimum tension for honing under which only trivial improvements are likely to be obtained is 500 lbs. The maximum permissible honing tension for any installation is the maximum load that the threads can carry without the risk of breaking. This value can easily be determined for a particular size and shape of electrode joint. In practice, so long as it is not higher than the maximum permissible tension, as defined above, the desirable level of tension load for honing is determined by the maximum effort the operators carrying out the screwing in of the nipple, can expend in overcoming the frictional resistance of the thread surfaces while tension is being applied. For a large commercial scale operation particularly satisfactory results have been obtained between 2000 and 3000 lbs tension, although, of course, on other plants, higher or lower loads may be preferred and can easily be selected. The magnitude of the tension load during honing can be monitored, for example, by measuring the oil pressure in the hydraulic tensioning device.

It is particularly preferred that the operators carrying out the honing operation and engaging the lever arms 22 maintain a constant and uniform effort throughout the full entry of the nipple 14. Ensuring this can be facilitated, for example, by the use of torque wrenches attached to the turning handles 22.

After completion of the honing operation as described above, the honing tension is terminated and the nipple 14 is unscrewed either completely from the end of the socket 12, or according to the preferred method of operation only to the first, or alternatively, the second thread from the top end of the socket. Then the honing tension is re-applied and the nipple is screwed home again, exactly as described above for the first honing operation.

At the completion of the second honing operation, the honing tension is again terminated and the nipple 14 is unscrewed all the way out of the socket 12. This nipple 14, the marked end of which is now double-honed to the correspondingly marked socket at the top end of the new electrode segment 10 is now supplied with a suitable protective cover and set aside for later use in a future step when adding the next new segment to the electrode after the present new segment had been installed and become part of the electrode. The disc is removed from the socket.

While the preferred way of carrying out the invention is by a double step of honing as described above, the invention encompasses also assembly operations that employ only a single honing step. While the smoothness and contact area of the inner thread surfaces is much improved after only a single honing under tension, substantial further improvement is achieved by a second honing step. However, the benefit obtained after more than two honing operations is only negligible.

The new electrode segment is now removed from its securely held vertical position and is reversed, end for end. The socket at the top of the segment now is the one that will face the top socket on the existing electrode when in a later step of the operation shortly to follow, the segment is again turned end for end and made ready for "heading up" the electrode.

The segment is fixed securely in the vertical position. A nipple, one end of which is marked as having been honed to the socket on the top of the existing electrode in the furnace, in a previous honing operation, is removed from storage and is suspended over the socket of the segment in such a way that the end of the nipple opposite its marked end faces the socket.

This end of the nipple and the corresponding socket, are put through the same steps of operation as described previously for the socket at the opposite end of the electrode segment and corresponding nipple end. Thus, the smoothing of the threads, the placement of the disc in the socket, suspending and centralizing the nipple, honing under tension, preferably done twice, are carried out exactly as described above. However, on completion of the honing the nipple is not unscrewed but is left in position in the socket.

The new electrode segment with the nipple in position is now again removed from its support and is again turned, end for end. It is transported by suitable means to near the top of the furnace and made ready for addition to the existing electrode.

In the second stage of the assembly, the "heading up" of the electrode, the furnace is shut down, i.e., the electric power supply is disconnected.

The new electrode segment with the nipple protruding downwardly from the now bottom socket, is suspended by suitable means, for example, a chainfall secured to a crane over the existing electrode, in such a way that the protruding end of the nipple, marked as having been honed to the socket on top of the existing electrode in a previous honing operation, faces this correspondingly marked socket.

The threads in the electrode are cleaned and a disc, identical to the one used in the initial honing operation is placed in the base of the socket. This disc, in addition to the function described before, has an added function here, i.e., that of providing a "take-up" for the differential expansion between the nipple, usually made of graphite and the electrode, usually made of carbon, once the electrode is in operation.

The new electrode segment is lowered and the protruding nipple is carefully centered over the socket, preferably by a suitable centralization device. The intended abutting faces of the existing electrode and the new electrode segment are now preferably coated with an electrically conductive lubricant, such as, petroleum jelly, in order to help ensure a tight fit between the successive segments.

The new electrode segment with protruding nipple is then screwed home until the nipple snug fits against the disc at the bottom of the socket. Tension is applied during the screwing operation. Tension may be maintained, for example, by the same type of hydraulic tensioning device that was described previously in connection with tensioning during the initial honing operation or by other convenient means. The magnitude of tension and its limits are the same as used during the honing operation.

In a preferred way of carrying out the step of screwing home the electrode segment, no tension is applied during the engagement of the first or possibly the first two threads in order to minimize the risk of breaking these threads during tensioning.

One way of carrying out the screwing of the nipple with the new electrode segment into the socket on top of the existing furnace electrode is by attaching a suitable band to the segment equipped with a number of handles against which the operators exert the required rotationary force. A slow steady push applied uniformly is particularly preferred. Monitoring this, can be done, for example, by the use of torque wrenches attached to the turning handles.

Preferably, when the electrode is finally assembled, a chalk mark or other indication is placed across the join and sufficient torque is applied to ensure adequate contact between the abutting faces of the segments. The distance of relative movement of the segments upon application of full torque, as determined by the relative positions of the chalk marks after completion of the torquing, may be used to judge the efficiency with which the joint has been assembled.

A preferred way of practicing the invention is to do as much of the honing and assembly work as can be practically carried out without having to shut down the furnace. Thus, nipples are honed to particular sockets of electrode segments as can be arranged conveniently before their use in the assembly and after identifying the corresponding members with corresponding marks these nipples are stored, ready for use. Also, nipples can be honed to a socket of an electrode segment, left in position and then this combination of segment and nipple can be stored as a unit, ready for use. In the embodiment of the invention hereinbefore described, the furnace is shut down only during the final stage of the assembly process. This represents an additional advantage over the prior art of assembling under compression where every step of the operation has to be carried out while the furnace is shut down. Loss of furnace production time, therefore, may be decreased using the present invention.

The invention is particularly useful in minimizing the difficulties which result from the use of electrode support systems which impose stresses on the electrode joints.

A particularly preferred way of carrying out the invention is to use it in conjunction with the novel electrode nipple described in our pending U.K. application Ser. No. 14991/77 (E401).

Although the preferred way to assemble an electrode according to the present invention is by joining successive segments by nipples, as described above, it is also possible to construct an electrode by another embodiment of the invention from segments which have male or female threaded portions at either end respectively, enabling them to be screwed together directly.

EXAMPLE

A phosphorus furnace was operated continuously using electrodes made up of carbon segments from about 90 to about 114 inches in length by about 55 inches in diameter having threaded sockets at both ends. Dimensions of the sockets were as follows:

| Thread Pitch | 2 inches | |
| Depth of Socket | 21.125 | + 0.0125 inches |
| | | − 0.000 inches |
| Internal Diameter of Socket | | |
| Maximum, i.e. root of thread | 26.630 | + 0.0625 inches |
| | | − 0.000 inches |
| Minimum, i.e. tip of thread | 24.630 | + 0.0625 inches |
| | | − 0.0000 inches |

The segments were connected in the conventional manner using threaded graphite nipples of the following dimensions:

| Length | 41.568 | + 0.000 inches |
| | | − 0.125 inches |
| Diameter to thread tips | 26.500 | + 0.000 inches |
| | | − 0.0625 inches |
| Diameter to thread roots | 24.500 | + 0.000 inches |
| | | − 0.0625 inches |
| Start of thread from either end of nipple | 1.375 | + 0.000 inches |
| | | − 0.0625 inches |

The conventional manner of heading up the electrode comprised shutting down the furnace, screwing a new nipple into the upper socket of the existing electrode, lowering a new segment onto the protruding upper end of the new nipple and screwing the segment into position. All these steps were carried out with the weight of the members exerting a generally compressive force on the mating threads. A final torque of 40,000 ft lbs was then applied.

With this former procedure, the joints were generally considered inadequate, variable and unpredictable. In comparative tests, the torque required to undo the joint was found to be about 30,000 ft lbs which was substantially lower than the tightening torque, indicating a poor joint. Down time on the furnace for heading up averaged 40 minutes and electrode breakages were frequent.

In a trial run using the novel method of the invention essentially according to the embodiment described in the disclosure, the torque required to undo the joints was over 40,000 ft lbs indicating stronger and more consistent joints. Down time on the furnace for heading up was only 20 minutes. No electrode breakages were observed over a total period which, on average, produced at least six breakages under the formerly used method.

SUMMARY

The present invention, therefore, provides considerable improvement over the prior art of electrode assembly by providing stronger and more consistent joints with resulting reduced electrode breakages and also permitting a shorter down time on the furnace when a new segment is added. Modifications are possible within the scope of the invention.

What I claim is:

1. In a method of adding a new electrode segment to an elongate electrode suspended in a furnace wherein the electrode is formed by joining segments having threaded sockets at either end by a correspondingly threaded nipple, the improvement which comprises the following steps:
   (a) one end of said nipple is screwed into the socket of a first electrode segment constituting the top end of said electrode at least once while maintaining a tension load between said nipple and said electrode segment,
   (b) the other end of said nipple is screwed into one of the sockets of a second electrode segment constituting said new electrode segment at least once while maintaining a tension load between said nipple and said second electrode segment, said steps (a) and (b) being effected to result in a combination of said nipple screwed into either one of said electrode segments but not both, in the socket into which said nipple was previously screwed under tension, and
   (c) said combination is screwed into said socket of the other of said electrode segments while maintaining a tension load between said combination and said other of said electrode segments.

2. In a method of adding a new electrode segment to an elongate electrode suspended in a furnace wherein the electrode is formed by joining segments having threaded sockets at either end by a correspondingly threaded nipple, the improvement which comprises the following sequence of steps:
   (a) the said nipple is screwed into the socket at the top of the segment constituting the top end of said electrode at least once while maintaining a tension load between said nipple and said electrode and is subsequently removed,
   (b) the other end of said nipple is thereafter screwed into one of the sockets of said new electrode segment at least once while maintaining a tension load between said nipple and said new electrode segment, and
   (c) the combination of said nipple and said new electrode segment resulting from step (b) with the end of said nipple protruding from said combination is screwed into said socket at the top end of said electrode while maintaining a tension load between said combination and said electrode.

3. The method of claim 2 wherein step (a) is carried out prior to said segment constituting the top end of said electrode.

4. The method of claim 2 wherein the screwing in operation of said nipple is effected twice consecutively in both steps (a) and (b).

5. The method of claim 2 wherein said tension load is applied during steps (a), (b) and (c) only after the engagement of the first threads respectively of the joining members.

6. The method of claim 5 wherein said first threads are the first two threads.

7. The method of claim 2 wherein said tension load is from about 500 lbs up to that tension load which the threads of said joining members can carry without breaking.

8. The method of claim 2 wherein a thin spacer disc is placed into each of said sockets prior to each of steps (a), (b) and (c), said disc being dimensioned to engage the lower end of the nipple screwed into the socket and having a diameter up to about 70% of the nominal diameter of said socket.

9. The method of claim 8 wherein the diameter of said spacer disc is up to about 45% of the nominal diameter of said socket.

* * * * *